United States Patent [19]

Nakagawa et al.

[11] 4,302,411
[45] Nov. 24, 1981

[54] METHOD OF PRODUCING PLATE-SHAPED BODY

[75] Inventors: Tokihalu Nakagawa, Hirakata; Shoji Ohmiya, Shijonawate, both of Japan

[73] Assignee: Matsushita Electric Industrial Co., Ltd., Osaka, Japan

[21] Appl. No.: 112,137

[22] Filed: Jan. 14, 1980

[30] Foreign Application Priority Data

Jan. 19, 1979 [JP] Japan .................................. 54-5057

[51] Int. Cl.$^3$ ............................................ B29D 17/00
[52] U.S. Cl. .......................... 264/107; 425/DIG. 810
[58] Field of Search .............. 264/107; 425/DIG. 810

[56] References Cited

U.S. PATENT DOCUMENTS

| | | | |
|---|---|---|---|
| 3,060,516 | 10/1962 | Van Houten | 264/107 |
| 3,747,390 | 7/1973 | Knothe | 264/107 X |
| 4,213,927 | 7/1980 | Alberti | 264/107 |

FOREIGN PATENT DOCUMENTS

| | | | |
|---|---|---|---|
| 92614 | 3/1958 | Denmark | 264/107 |
| 881614 | 11/1961 | United Kingdom | 264/107 |

*Primary Examiner*—Thomas P. Pavelko
*Attorney, Agent, or Firm*—Stevens, Davis, Miller & Mosher

[57] ABSTRACT

A method of producing a plate-shaped body, particularly a video disc in which circumferential warp in the thicknesswise direction, thickness fluctuation and deflection of the signal track are minimized comprising The steps of pressing by a mold a thermoplastic resin which has been heated to a temperature above the softening point thereof, and cooling the thermoplastic resin to solidify the same. During the cooling, the pressure of the mold is decreased to a low level when the thermoplastic resin has been cooled down to a temperature around the softening point. The thermoplastic resin is allowed to be solidified without any substantial and local residual stress to ensure minimal circumferential warp, thickness fluctuation and deflection signal track.

2 Claims, 7 Drawing Figures

— × — CONVENTIONAL METHOD
--- △ --- PRESENT METHOD

——— CONVENTIONAL METHOD
----- PRESENT INVENTION

METHOD OF PRODUCING PLATE-SHAPED BODY

BACKGROUND OF THE INVENTION

The present invention relates to a method of producing a plate-shaped body having a flat surface of a high precision from a thermoplastic resin. More particularly, the invention is concerned with a method suitable for use in the production of video discs which are required to have minimized circumferential warp in the thicknesswise direction, high uniformity of thickness and small distortion of the signal track.

Typical conventional process for producing video discs comprises the steps of preparing a video-disc pattern (referred to as "stamper", hereinafter) in which information is stored in the form of a spiral groove, pressing the stamper against a video-disc material which is usually a thermoplastic resin such as polyvinyl chloride, while heating the video-disc material to a termperature above the softening point thereof, and decreasing the pressure, after cooling, to thereby obtain a video disc to which the information has been transcribed from the surface of the stamper.

This conventional process, however, is not satisfactory because it leaves a considerably large circumferential warp and uneven thickness distribution.

The present inventors have learned through experiments, that a high-pressure press at a temperature below the Vicat softening point causes an uneven pressure distribution which in turn creates a residual stress in the formed disc resulting in a large distortion of the disc. It was confirmed that, non-uniform high pressure at a temperature below the Vicat softening point causes a residual stress due to contraction of the video disc to permit warping of the disc.

SUMMARY OF THE INVENTION

It is, therefore, a major object of the invention to provide a method of producing a plate-shaped body such as a video disc capable of providing a product having minimized warp, thereby to overcome the above-mentioned problems of the prior art.

To this end, according to the invention, there is provided a method of producing a plate-shaped body such as a video disc, having the steps of pressing a mold to a thermoplastic resin heated to a temperature above the softening point and cooling the mold and the thermoplastic resin to solidify the latter thereby obtaining the plate-shaped body, characterized by comprising a step of decreasing the pressure when the thermoplastic resin has been cooled down to a temperature in the vicinity at the softening point.

Preferably, the decrease of the pressure is made at a temperature in the vicinity of the softening point of the thermoplastic resin.

A copolymer of polyvinyl chloride or vinyl acetate is advantageously, but not exclusively, used as the thermoplastic resin. In this case, the pressure is decreased when the mold has been cooled down to 70° to 90° C.

Preferably, the pressure is decreased to 10 Kg/cm² or lower.

The above and other objects, as well as advantageous features of the invention will become more clear from the following description of the preferred embodiments taken in conjunction with the accompanying drawings.

DESCRIPTION OF THE PREFERRED EMBODIMENTS

Although the invention will be described hereinafter with specific reference to the production of a video disc by way of example, it is to be noted that the method of the invention is applicable equally to the production of various plate-shaped bodies.

Figure 1:
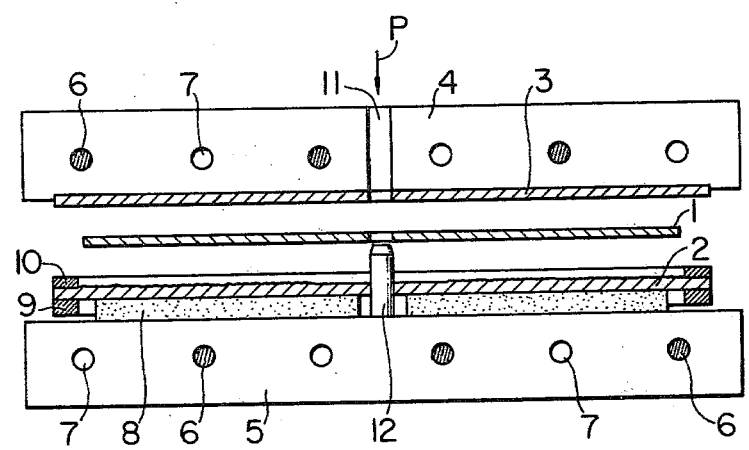
FIGS. 1 and 2 are side elevational sectional views of an apparatus suitable for use in carrying out the method of the invention.
Figure 2:
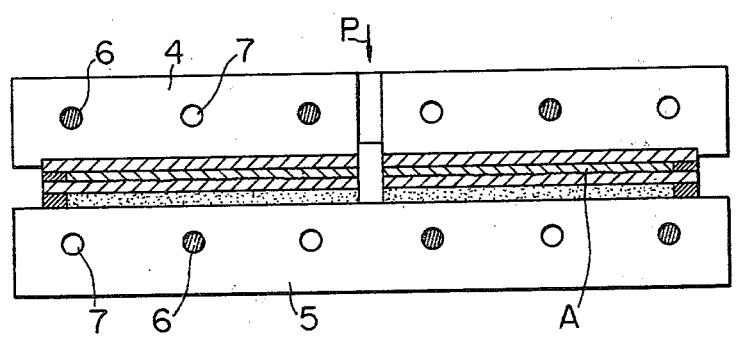

FIGS. 1 and 2 show an apparatus suitable for use in carrying out the method of the invention in the states before and after the pressing. Reference to these Figures, a reference numeral 1 denotes a video disc biscuit which is in this case a sheet of polyvinychloride of 0.2 mm thick and having a Vicat softening point of 85° C. The kind of material and the thickness of the sheet specified above are not exclusive and it is possible to use other thermoplastic resins than polyvinylchloride and thicknesses other than 0.2 mm can be used. Video signals are stored in a video disc stamper 2, in the form of a spiral track. A back plate 3 is placed at the opposite side of the video disc biscuit 1 to the video disc stamper. The back plate 3 may be substituted by another video disc stamper. In the latter case, the video signals are recorded on both sides of the product video disc.

The video disc stamper 2 and the back plate 3 are attached to stamper cases 4, 5 by suitable means which are not shown but may be adhesive or screws. Each stamper case has passages 6 for heating steam, as well as passages 7 for cooling water, so that the video disc stamper 2, video disc biscuit 1 and the back plate 3, which are brought together, are heated or cooled by the heating steam or the water as necessitated.

A reference numeral 8 designates a platen which, for example, is made of silicon rubber of having a Shore hardness of about 40 to 60. The platen 8 is adapted to uniformly press the stamper 2 against the video disc biscuit 1. Other elastic materials than silicon rubber having a Shore hardness ranging between 40 to 60 and capable of withstanding a temperature of 200° C. can be used as the material of the platen 8.

A guide member 9 is adapted to prevent the platen 8 from unnecessarily spreading in the radial direction when the latter is pressed, and is effective particularly in suppressing uneven spreading of the platen.

A reference numeral 10 denotes a disc guide which is adapted to prevent the video disc material from being excessively spread when the latter is heated under compression, and to uniformalize the thickness of the finished video disc thereby to minimize the circumferential warp in the thicknesswise direction of the disc. The disc guide 10 acts also to limit the outer diameter of the video disc. The disc guide 10 has an annular form with an inside diameter slightly larger than the outside diameter of the video disc biscuit 1 and a thickness somewhat smaller than that of the video disc biscuit 1. The disc guide 10 is placed concentrically with the recording tracks in the stamper 2.

A center shaft 12 received by a center bore 11 formed in the stamper case 4 is adapted to correctly locate and center the video disc.

According to the invention, a video disc is produced in accordance with the following procedure using the apparatus having the described construction.

After placing the video buscuit 1 between the video disc stamper 2 and the back plate 3 as shown in FIG. 1, the stamper cases 4, 5 are brought together as shown in FIG. 2. Then, the heating steam is circulated through the passages 6 in the stamper cases 4, 5 thereby to heat the stamper 2, the video biscuit 1 and the back plate 3, through the walls of the stamper cases 4, 5 up to a temperature above the softening point of the material of the video disc buscuit 1, typically up to 140°-160° C. Then, the stamper cases 4, 5 are pressed toward each other by a hydraulic press or the like means (not shown) under a pressure of 100 Kg/cm$^2$ to 150 Kg/cm$^2$. This pressure and temperature are maintained for a certain period, e.g. about 10 seconds. Then, the supply of the heating steam is stopped and, instead, cooling water is circulated through the passages 7 in both stamper cases 4, 5 to cool the stamper 2, the back plate 3 and the video disc biscuit 1 down to a temperature in the vicinity of the softening point of polyvinyl chloride which is the material of the video disc biscuit, e.g. down to 70° to 85° C. as measured at the portion of the stamper cases corresponding to the outer periphery of the video disc. Then, the pressure is decreased from the above stated level of 100 to 150 Kg/cm$^2$ down to about 0.3 Kg/cm$^2$. The cooling is continued even after the decrease of the pressure. Finally, the pressure is reduced to 0 (zero) to release the stamper cases 4, 5 when the video disc has come down below 45° C., and the video disc to which the video signals have been transcribed is separated from the stamper 2 and the back plate 3.

The above-mentioned pressure at which the stamper cases are pressurized, the temperature to which the video disc biscuit is heated and the temperature at which the pressure is decreased are preferably adopted when polyvinyl chloride is used as the material of the video biscuit, and are changed suitably depending on the material of the video disc biscuit.

Figure 3:
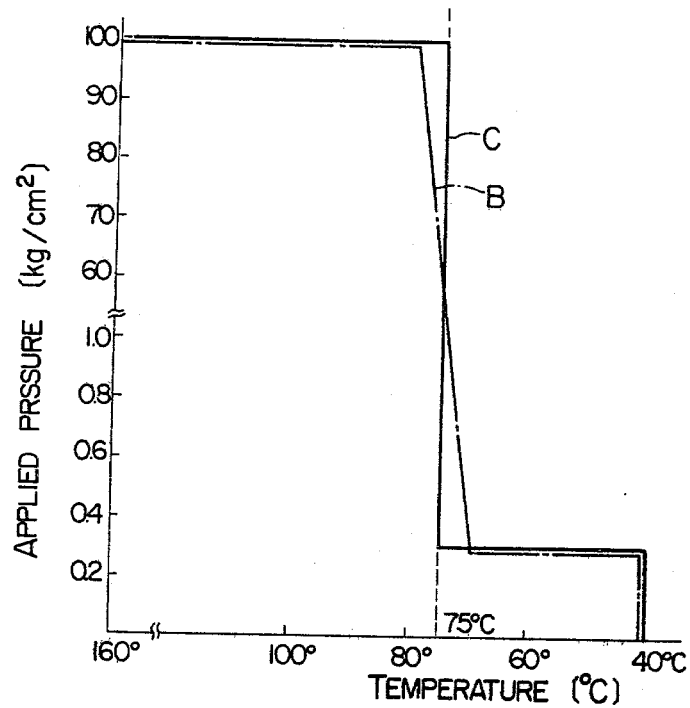
FIG. 3 is a diagram showing an example of the relationship between the pressure of press and temperature as observed in the method of the invention.

FIG. 3 shows how the pressure is changed in relation to the temperature in the method of the invention. More specifically, the pressure may be decreased gradually as shown by a curve B as the temperature drops across the softening temperature zone which is preferably 70° C. to 90° C. when the softening temperature is 85° C., or may be drastically lowered at the temperature zone around the softening temperature as shown by a curve C. It is possible to obtain the advantageous effect of the invention irrespective of whether the pressure is changed along the curve B or C.

Figure 4:
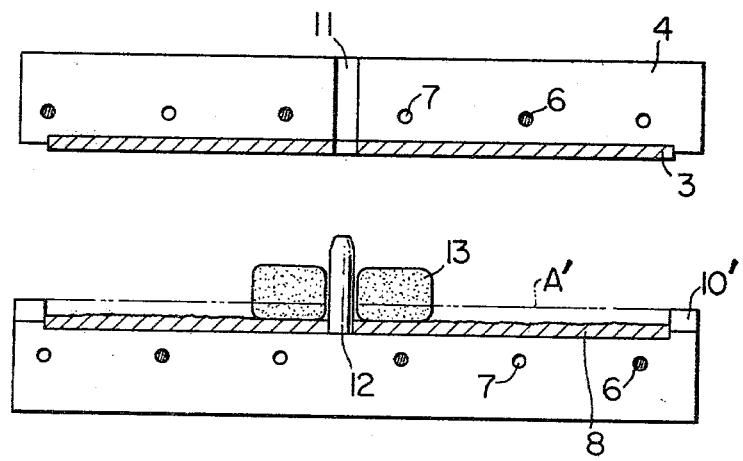
FIG. 4 is a side elevational sectional view of another example of the apparatus for carrying out the method of the invention.

As stated before, various materials other than the sheet material of a thermoplastic resin such as polyvinyl chloride can be used as the material of the video disc biscuit. For instance, a solid solution type thermoplastic resin in the form of a jelly as shown in FIG. 4 can be used as the material of the video disc biscuit. In FIG. 4, a reference numeral 13 denotes a doughnut-like plasticized material obtained by heating a copolymer of vinyl chloride and vinyl acetate up to a temperature of 160° to 170° C.

It is possible to obtain a thick video disc by carrying out the described method having the steps of heating, pressing, cooling and reduction of pressure, using the material 13 in place of the video disc buscuit 1.

As has been described, according to the invention, there is provided a method of producing a video disc having the steps of imparting to the video disc biscuit a heat and pressure sufficient for transcribing the video signals from the video disc stamper 2 over a required time length, cooling the video disc biscuit and reducing the pressure when the video disc biscuit has been cooled down to a temperature in the vicinity of the softening point of its material.

The inventors have confirmed through experiments that, by reducing the pressure when the video disc biscuit has been cooled down to a temperature in the vicinity of the softening point, it is possible to produce a video disc having reduced circumferential warp in the thicknesswise direction of the disc, minimized deflection of the singal track and a small thickness fluctuation.

Figure 5:
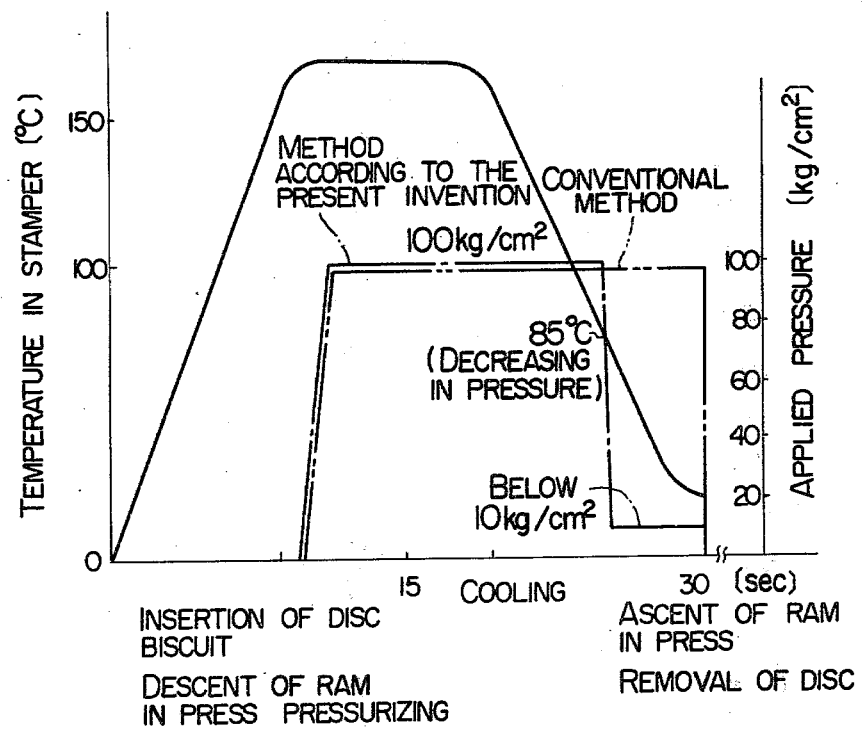
FIG. 5 is a chart showing the relationship between the forming temperature and pressure in the method of the invention as compared with that in the conventional method.

FIG. 5 shows how the pressure is changed in the method of the invention in relation to temperature, in comparison with that of the conventional method. In the method of the invention, the pressure is decreased to 10 Kg/cm$^2$ during the cooling when the temperature of the video disc biscuit has been lowered down to 85° C. which is the softening temperature of the video disc biscuit material which, in this case, contains 93.6% of copolymer of vinyl acetate and vinly chloride, 5.4% of plasticizer and 1.0% of filler.

Figure 6:
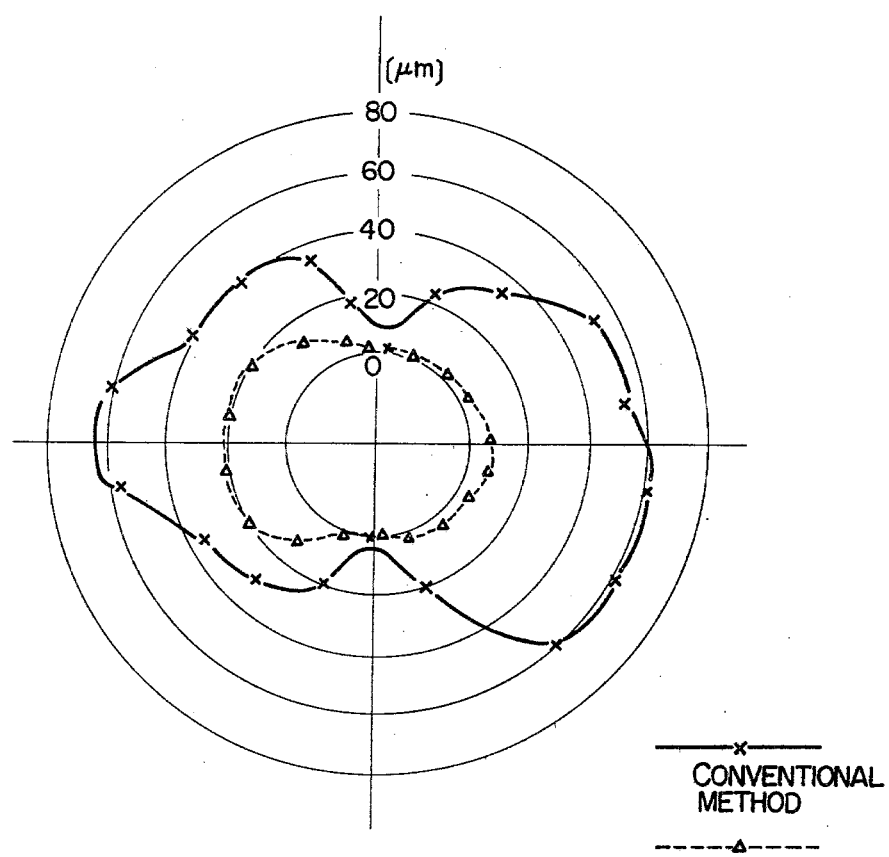
FIG. 6 shows the result of measurement of deflection of recording tracks in the video discs produced by the method of the invention and by the conventional method.

FIG. 6 shows the radial deflection of the signal track in the video disc produced in accordance with the method of the invention. The deflection was measured in accordance with the following manner. In each disc, a signal track corresponding to a circle of 140 mm radi. centered at the center of the disc was selected and radial deflections or deviations of a plurality of circumferentially equi-spaced points on this signal track were measured. Then a circle centered at the disc center and passing the measuring point of the greatest deviation from the 140 mm radi. circle toward the disc center is drawn. Then, the radially outward deviation of all of the measuring points were measured from this circle, and graphically shown in FIG. 6.

As will be seen from FIG. 6, the radial deviation of the outermost measuring point and the innermost measuring point from each other is as large as about 60 $\mu$m, in the video disc produced in accordance with the conventional production method. This means that the signal track in the video disc deflects within the radial width of about 60 $\mu$m in one full rotation of the video disc.

In sharp contrast to the above, the radial deflection of the signal track is as small as about 20 $\mu$m in the video disc produced by the method of the invention.

It is noted here that the signal track is of a spiral groove, therefore, exactly speaking, the signal track is not in a perfect coincidence with the circle having 140 mm radi. However, since the pitch of the signal track is about 2 to 3 $\mu$m, the signal track can be estimated as the circle in such a radial deflection measurement.

Figure 7:
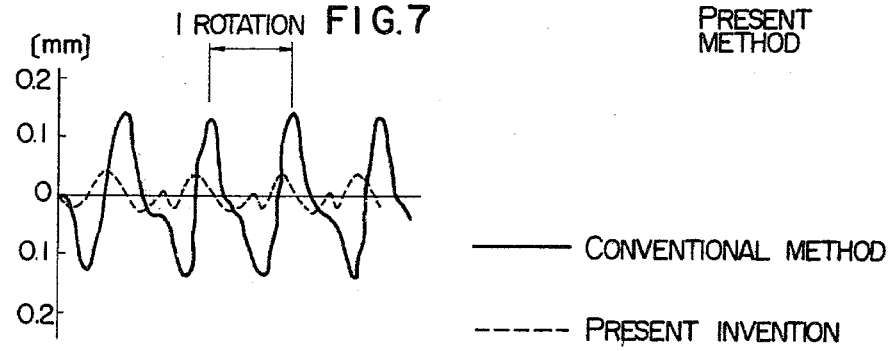
FIG. 7 shows the circumferential warp in the thicknesswise direction of the discs produced by the method of the invention and by the conventional method.

FIG. 7 shows the result of measurement of the circumferential warp of the video disc which is the deviation of the disc surface in the thicknesswise direction, i.e. in the direction of axis of the disc as measured on a circle of a constant radius. From FIG. 7, it will be realized that the disc produced in accordance with the conventional method exhibits a circumferential warp which is as large as 0.3 mm or so, while the disc produced by the method of the invention exhibits only a small circumferential warp of less than 0.1 mm.

These advantageous features of the video disc produced in accordance with the method of the invention are attributable to the decrease of the pressure effected at a temperature range around the softening point of the disc material which in turn permits a solidification and hardening of the material without leaving no substantial residual stress to suppress the tendencies of generations of thickness fluctuation, deflection of signal tracks and circumferential warp of the disc.

Having described the invention through specific form of compression type forming method, it is to be noted here that the invention can equally be applied to other forming methods such as injection molding method.

Other changes and modifications are possible without departing from the scope of the invention which is limited solely by the appended claims.

What is claimed is:

1. In a method for producing a plate-shaped body including the steps of pressing with a mold a thermoplastic resin which has been heated to a temperature above the softening point of said thermoplastic resin and then cooling said thermoplastic resin permitting hardening thereof to obtain said plate-shaped body, the improvement comprising the steps of decreasing the pressure of said mold to a pressure of $10/Kg/cm^2$ when said thermoplastic resin has been cooled to a temperature in the vicinity of said softening point, holding said thermoplastic resin at said decreased pressure while further cooling thereof, and subseuently removing said thermoplastic resin from said mold.

2. A method of producing a plate-shaped body as claimed in claim 1, wherein said improvement comprises utilizing as said thermoplastic resin a copolymer of polyvinyl chloride and polyvinyl acetate having a softening temperature in a range of 70° to 90° C.

* * * * *